United States Patent
Robba et al.

(10) Patent No.: US 9,894,044 B2
(45) Date of Patent: Feb. 13, 2018

(54) METHOD FOR SECURE SIGNAL TRANSMISSION IN A TELECOMMUNICATION NETWORK, IN PARTICULAR IN A LOCAL AREA NETWORK

(75) Inventors: Mauro Robba, Milan (IT); Claudio Zammarchi, Milan (IT); Giorgio Grasso, Milan (IT)

(73) Assignees: TELECOM ITALIA S.P.A., Milan (IT); ADVANCED DIGITAL BROADCAST SA, Eysins (CH)

( * ) Notice: Subject to any disclaimer, the term of this patent is extended or adjusted under 35 U.S.C. 154(b) by 0 days.

(21) Appl. No.: 11/664,967

(22) PCT Filed: Oct. 15, 2004

(86) PCT No.: PCT/EP2004/011665
§ 371 (c)(1),
(2), (4) Date: Apr. 9, 2007

(87) PCT Pub. No.: WO2006/039941
PCT Pub. Date: Apr. 20, 2006

(65) Prior Publication Data
US 2009/0204805 A1    Aug. 13, 2009

(51) Int. Cl.
*H04L 9/00* (2006.01)
*H04L 29/06* (2006.01)
*H04W 12/02* (2009.01)

(52) U.S. Cl.
CPC ......... *H04L 63/0485* (2013.01); *H04W 12/02* (2013.01)

(58) Field of Classification Search
USPC .......................... 713/153, 150, 151; 380/270
See application file for complete search history.

(56) References Cited

U.S. PATENT DOCUMENTS

| | | | |
|---|---|---|---|
| 5,583,940 A * | 12/1996 | Vidrascu et al. | 713/151 |
| 5,959,992 A | 9/1999 | Benayoun et al. | |
| 7,080,039 B1 * | 7/2006 | Marsh | 705/51 |
| 7,191,335 B1 * | 3/2007 | Maillard | 713/176 |
| 2002/0042875 A1 * | 4/2002 | Shukla | 713/151 |

(Continued)

FOREIGN PATENT DOCUMENTS

| WO | WO 0046994 A1 * | 8/2000 |
|---|---|---|
| WO | WO 00/57636 | 9/2000 |

OTHER PUBLICATIONS

"3rd CD 15045-01: Information Technology—Architecture for the Residential Gateway (ARG) (Homegate)", ISO/IEC JTC 1/SC 25 N. 973, pp. 1-38, May 30, 2001.

(Continued)

*Primary Examiner* — Vu Le
*Assistant Examiner* — Tracy Mangialaschi
(74) *Attorney, Agent, or Firm* — Mark M. Friedman (57) ABSTRACT

In a telecommunication network, a modular expandable gateway connects a local area network to a wide area network and includes a base module and a plurality of add-on modules arranged in one or more stacks, the base module and the add-on modules including respective encryption/decryption engines to exchange secure information with each other, thus frustrating any possible fraudulent interception of the information at the module interconnections.

12 Claims, 3 Drawing Sheets

(56) References Cited

U.S. PATENT DOCUMENTS

| | | |
|---|---|---|
| 2002/0065935 A1* | 5/2002 | Koperda et al. .............. 709/238 |
| 2004/0010653 A1* | 1/2004 | Grundy ................... H04L 12/56 |
| | | 710/315 |
| 2004/0172658 A1 | 9/2004 | Rakib et al. |
| 2005/0068938 A1* | 3/2005 | Wang ................ H04M 1/72502 |
| | | 370/352 |
| 2005/0086465 A1* | 4/2005 | Sapkota et al. ............... 713/150 |
| 2005/0207581 A1* | 9/2005 | Qi et al. ........................ 380/270 |

OTHER PUBLICATIONS

"ISO/IEC CD 15045-1 Information Technology: A Residential Gateway Model for Home Electronic System (HES)", ISO/IEC JTC 1/SC WG1 N. 972, pp. 1-34, Mar. 26, 2007.

\* cited by examiner

METHOD FOR SECURE SIGNAL TRANSMISSION IN A TELECOMMUNICATION NETWORK, IN PARTICULAR IN A LOCAL AREA NETWORK

CROSS REFERENCE TO RELATED APPLICATION

This application is a national phase application based on PCT/EP2004/011665, filed Oct. 15, 2004, the content of which is incorporated herein by reference.

BACKGROUND OF THE INVENTION

Field of the Invention

The present invention generally relates to communications through local area networks (LAN), in particular to a method for securing the information transmitted through a gateway in residential environments such as houses and small-office/home-office (SOHO) environments.

Description of the Related Art

The deployment of broad-band data communications to residential environments is one of the main objectives currently pursued by telecom companies. The technology enabling access of user appliances, typically personal computers, to data communication networks, starting from analog MODEMs that allowed relatively low speed data communication over the public switched telephone network (PSTN), has been driven by the fast diffusion of the Internet to evolve towards more powerful solutions. In particular, the introduction of integrated service digital network (ISDN) and, even more, digital subscriber line (DSL) technologies, such as ADSL, SDSL, HDSL and VDSL (globally referred to as XDSL technologies) has significantly increased the communication bandwidth, making it possible to offer new high value services to the users. Nowadays, a step forward in the increase in the communication bandwidth is expected from the deployment of fiber optic communications to the user premises.

In parallel to the above-described phenomenon, local data communication networks, once restricted to large entities, have started to become popular also in relatively small environments, and particularly in residential environments. Especially in SOHO/residential environments, small local communication networks are useful, because they allow interconnecting personal computers, printers and similar data devices, and enable voice and video services. These small local communication networks are mainly Ethernet-based networks, but several other technologies exist, for example Wifi, USB, homePNA, Power-Line Transmission, Bluetooth™, DECT, just to cite some.

It is therefore desirable to have a device that acts as a residential gateway, allowing interconnecting one or more different user's terminals/appliances, particularly in a user local network, and enabling access to an external communication network providing Internet, voice and/or video services.

A problem in developing residential gateway devices resides in the breadth of different local network technologies and access technologies to external broad-band communication networks. Developing a residential gateway selecting specific local network and external network access technologies that, at the moment, seem to be the most popular, may cause the device to quickly become obsolete. On the other hand, implementing all, or at least the more popular existing technologies in a single device is not a feasible approach, at least from the cost viewpoint. Considering the market target for these gateway devices, low price is considered essential to make them attractive; in particular, the user may be discouraged from spending a considerable amount of money for purchasing functions that, at least at the beginning, he/she does not foresee to exploit. Other important considerations are physical dimensions, which should be small, and ease of use. In any case, the rapid evolution of networking and access technologies would inevitably cause even the more complete and up-to-date device to become obsolete more or less rapidly.

Residential gateways having a modular structure have been proposed. The modular structure allows the user to buy a device in a base configuration, sold at relatively low price; the device functions can be successively expanded, depending on the needs, by adding new components, which the manufacturer can develop at different time, to keep pace with the technological evolution.

Some known modular residential gateways have a fixed-size enclosure capable of housing a predetermined number of expansion components that the user can purchase at different times.

The drawbacks of this solution are that the gateway enclosure needs to be relatively bulky, and installing expansion components is not straightforward for the user. Additionally, the initial cost may be unacceptably high for the user, especially if the need of expanding the structure is not initially foreseen. Moreover, only a limited number of expansion components can be installed, which limit the possibility of expanding the gateway.

A better solution is proposed in US 2002/0065935. In this document, a modular residential gateway is disclosed having a modular design according to which, starting from a base configuration comprised of two stacked modules, additional modules can be stacked up as desired by the user, to expand the gateway functions. One of the two modules is a power supply module, providing the power for the stack of modules.

Another solution is proposed in U.S. Pat. No. 5,959,992. This patent relates to a process for operating a communication equipment having a set of mechanically connected apparatuses being vertically and horizontally packed. Each apparatus comprises telecommunication functions such as echo cancellation, data compression or ISDN gateway, as well as vertical and horizontal mechanical and communication connections respectively allowing the vertical and horizontal exchanges of frames with neighbouring apparatuses. The communication is based on a frame comprising n bytes routing header with n being an integer and an Asynchronous Transfer Mode (ATM) cell.

The document titled "ISO/IEC FCD 15045-1 Information Technology: A Residential Gateway model for Home Electronic System (HES)", which is a ISO/IEC standard draft coded ISO/IEC JTC 1/SC 25 WG1 N. 972, 13 Aug. 2004, provides a model for a residential gateway of a Home Area Network (HAN), possibly of a modular type. The document describes, among others, the security requirements of such a residential gateway, in particular it specifies security measures to ensure the integrity of information that may pass through the residential gateway.

As stated in this document, there are many potential security threats to a home network, that may originate from the WAN (Wide Area Network) or from the HAN. These threats may compromise the integrity of the Home, Network or expose private messages between HAN devices or between the WAN and HAN. Most of the security issues facing the Home Electronic System involve the information and traffic that passes through the Residential Gateway. In many cases the gateway is responsible for ensuring that the security, privacy, and integrity of the network are not compromised and that transactions, such as financial transactions, take place securely between trusted entities.

The above document also states that selected sensitive traffic between the gateway and the Trusted Server associated with devices on the HAN shall be capable of being secured using SSL/TLS ("Secure Sockets Layer/Transport Layer Security"), or a similar encryption methodology of appropriate strength according to the information security required for the device. It is also stated that, where the delivery HAN in the home uses a technology that can be monitored surreptitiously, it is highly recommended that traffic between devices in the house and the gateway should be encrypted.

SUMMARY OF THE INVENTION

The Applicant has observed that in a network wherein there is need to transmit secret/confidential information (such as for secure data transitions, protected remote device configuration and management, provisioning of personal voice and/or video services, etc.) from a WAN to a LAN (Local Area Network) or vice versa, and wherein the interface between LAN and WAN is defined by a modular access gateway as in the discussed prior art, the secret/confidential information could be "sniffed" during the infra-module transmission. This is due to the absence of any protection, in modular gateway of the above-cited prior art, for the infra-module transmission. The information transmitted between one module and another could be for example intercepted at the interconnections between modules and then sensitive information could be modified or duplicated for unauthorized purposes.

Therefore, even if secure transmission is guaranteed in some parts of the network, such as between the WAN interface of modular gateway and the WAN (for example, by using secure tunneling transmission) and between the modular gateway and the terminals (such as contemplated in the wireless LAN encryption standards), the absence of an infra-module transmission protection makes the modular gateway a critical point for fraudulent intrusion.

Examples of information that could be "sniffed" and used for fraudulent purposes are:
  information related to module functionality: such information could allow reproducing the same functionality on a unauthorised module;
  information related to personal services (such as configuration and provisioning data, typically stored in the add-on modules), which could allow using the same service on a unauthorised module;
  information related to traffic to/from the users, such as in voice over IP communications.

The Applicant has therefore tackled the problem of providing a secure transmission between an external wide data network (WAN) and a local data network (LAN) including a modular gateway. The Applicant has also tackled the problem of providing a modular gateway, particularly but non-limitatively adapted to the use in residential environments, configured to provide a secure mechanism to protect information transmitted between the terminals of a LAN and a WAN.

The Applicant has found that, by using an encrypted protocol for infra-module transmission, the transmission between the external data network and the local data network including the modular gateway can be made secure. Moreover, in this way, all the segments of the network transmission link, i.e. from the WAN to the terminals of the LAN, can be protected against intrusions.

According to the present invention, the encrypted protocol for infra-module transmission may be used for transmission of configuration data, of user data, or both.

For the purposes of the present invention, with "management data" it is intended both the configuration data remotely provisioned by the WAN to the gateway for the configuration of the gateway and/or the terminals, and the control data transmitted between the WAN and the LAN to allow the remote operative control of the gateway and or the LAN terminals. Still for the purposes of the present invention, with "user data" or "traffic data", it is intended the information connected to the particular services enjoyed by the users through the terminals.

According to a first aspect thereof, the present invention thus relates to a method for secure information transmission in a telecommunication network, the telecommunication network comprising a wide area network, a local area network and a modular gateway connecting the local area network to the wide area network, the modular gateway comprising a base module and at least an add-on module, the method further comprising encrypting an information in the base module and decrypting said information in the at least an add-on module.

Preferably, the method further comprises encrypting a further information in the at least an add-on module and decrypting said further information in the base module.

Preferably, the method further comprises sending an encrypted information from the wide area network to the modular gateway and decrypting said encrypted information in the base module.

Preferably, the method further comprises encrypting a further information in the base module and sending said further information to the wide area network.

Advantageously, the modular gateway comprises a plurality of add-on modules and any information exchanged between the base module and each add-on module of said plurality of add-on modules is encrypted.

Said information preferably comprises configuration data. Said information may comprise user data.

Preferably, said information is in the payload of a TCP/UDP protocol layer.

According to further aspect thereof, the present invention relates to a telecommunication network comprising a wide area network and a local area network connected to each other, the local area network comprising a modular gateway and at least one user's terminal operatively connected to the modular gateway, and the modular gateway comprising a base module and at least an add-on module, wherein the wide area network is connectable to the user's terminal via a first link between the wide area network and the modular gateway, a second link between the base module and the add-on module and a third link between the modular gateway and the terminal, characterized in that the modular gateway is configured to provide encryption on the second link.

Preferably, the wide area network comprises a central office suitable to communicate with the modular gateway via the first link and the central office and the modular gateway are configured to provide encryption on the first link.

The modular gateway and the user's terminal are preferably configured to provide encryption on the third link.

The modular gateway may comprises a base module connected to the wide area network and at least an add-on module connected to the base module, the base module and the at least an add-on module comprising respective encryption/decryption units to exchange encrypted information.

In a further aspect thereof, the present invention relates to a residential modular gateway for a telecommunication network, comprising a base module and operatively connected to each other, characterized in that the base module and the at least an add-on module are configured to exchange encrypted information with each other.

Preferably, the at least an add-on module comprises a plurality of add-on modules arranged in a stack and wherein the base module and each add-on module of said plurality of add-on modules comprise an encryption/decryption unit.

Preferably, the at least an add-on module comprises a further plurality of add-on modules arranged in a further stack connected to the first stack, and each add-on module of said further plurality of add-on modules comprises an encryption/decryption unit.

The at least an add-on module may comprise a Wifi module suitable to communicate with a Wifi phone and an Integrated Access Device module suitable to communicate with a Pots or Dect terminal.

In a further aspect thereof, the present invention relates to a method of transmitting information in a residential modular gateway, the gateway including at least a first and a second module, the method comprising encrypting an information at the first module and decrypting the information at the second module. Said information is preferably encrypted in the payload of a TCP/UDP protocol layer.

BRIEF DESCRIPTION OF THE DRAWINGS

The features and advantages of the present invention will be made apparent by the following detailed description of an embodiment thereof, provided merely by way of non-limiting example, made in connection with the attached drawing sheets, wherein.

DETAILED DESCRIPTION OF THE INVENTION

Figure 1:
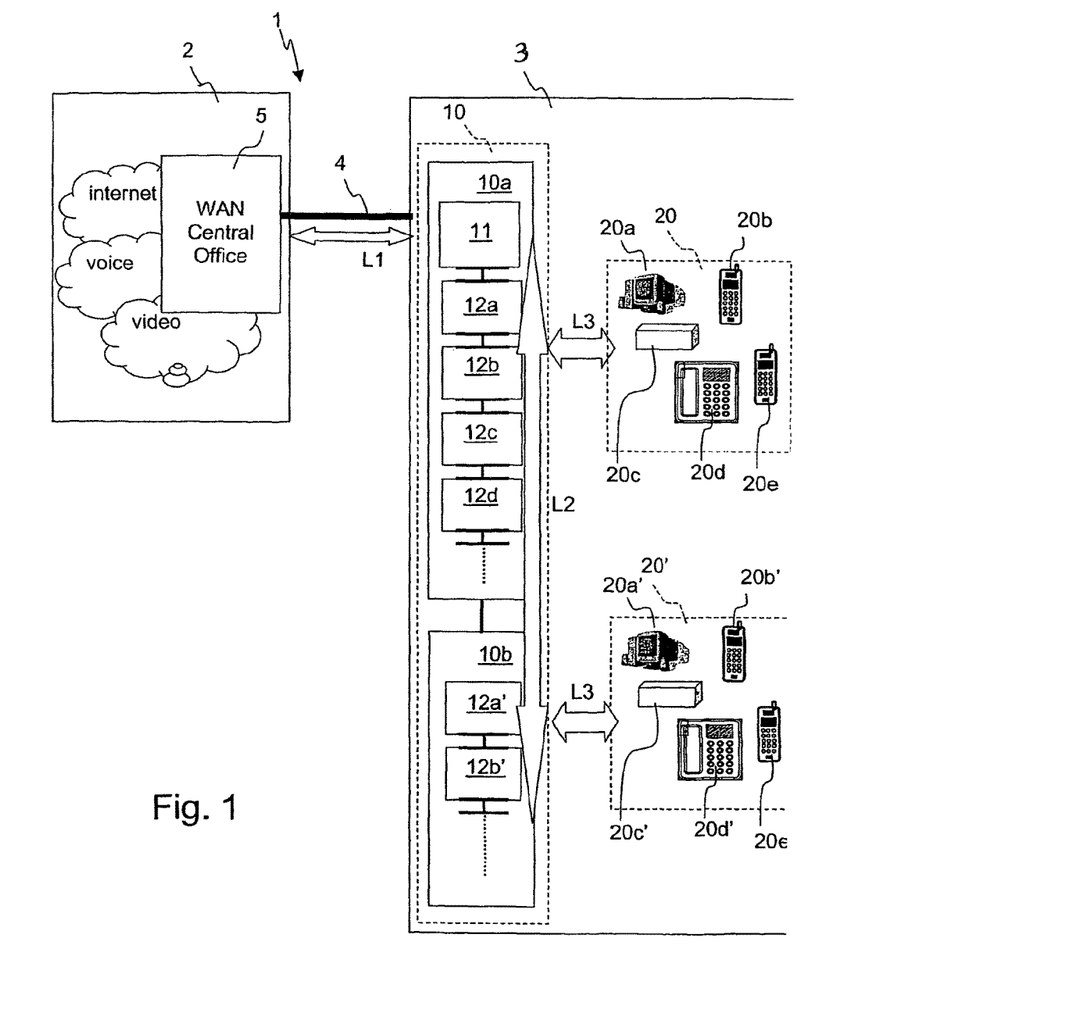
FIG. 1 schematically shows a telecommunication network including a WAN and a LAN.

With reference to the drawings, in FIG. 1 a portion of a telecommunication network 1 is schematically shown.

The telecommunication network 1 comprises a Wide-Area Network (WAN) 2 (which can be also a metropolitan area network (MAN)), a Local-Area Network (LAN) 3 (which can be also a Home Area Network) and a communication line 4 connecting the LAN 3 to the WAN 2.

The communication line 4 is preferably an XDSL line, an optical fibre line or a cable modem line, so as to define a broad-band channel (in particular a channel for transmission at a speed of at least 256 kbps).

The WAN 2 includes a central office 5, which in turn comprises a group of network equipments required to provide, to the users of the LAN, access to a certain number of telecommunication services, such as internet, voice services, video services, etc. The WAN 2 also includes a service provider management system suitable to provide management data for the LAN.

The LAN 3 comprises a modular gateway 10 and a plurality of user's terminals 20 suitable to communicate with the modular gateway 10.

The gateway 10 is particularly, but non-limitatively, adapted for residential use (home or SOHO environments) and enables users to access the telecommunication network 1.

The gateway 10 has a modular structure that allows expansion of the gateway functions according to the user's needs; in particular, the gateway 10 is composed of modules mechanically and electrically interconnected to each other. The gateway 10 does not have a fixed-size enclosure; each of the modules comprises a housing of any desired shape and the overall physical dimension of the gateway increases with the number of modules that are added.

The gateway 10 comprises a base module 11, providing basic gateway functions, and a plurality of add-on (or expansion) modules 12 providing additional voice, data and video services for respective user's terminals.

The modularity of the gateway 10 provides the following advantages:
- possible use of a plurality of different LAN connection technologies, such as Ethernet, USB, Wireless, Powerline, HPNA, etc.;
- possible use of different terminal typologies, in particular data, voice and video;
- possible increase of the gateway functionalities (firewall, VPN engine, etc.) by provision of specific add-on modules.

The base module 11 is the only module that interfaces with the WAN 2. In particular, the base module 11 enables access to the WAN 2 over the line 4. On the LAN side, the base module 11 may have connection ports for direct connection of user's terminals, such as Ethernet ports and USB ports.

The base module 11 could also be equipped with a card reader (not shown) to allow a user to subscribe to specific services by means of a smart card.

The add-on modules 12 provide additional LAN interfaces. The add-on modules 12 preferably include:
- a Wifi module 12a, providing an access point of the 802.11b/g type; in particular, this module is suitable to set up a wireless local network for data, video and voice services and allows communication of the gateway 10 with user wireless appliances installed in the user environment, such as personal computers 20a, Wifi phones 20b and STBs (Set Top Boxes) 20c; this module is also preferably configured to provide VoIP (Voice over IP) functionalities for VoIP Wifi phones.
- a IAD (Integrated Access Device) module 12b, in particular a Pots-ISDN/Dect, suitable to operate as IAD for Pots and Dect voice handsets 20d, 20e; in particular, this module is configured to provide VoIP functionalities for POTS and DECT phones, thus enabling voice communication through the WAN communication channel; and
- a switch module 12c of the Ethernet type, providing a plurality of Ethernet ports 12c; these Ethernet ports perform the function of local network hub/switch and allow connection of a corresponding number of LAN devices;

a Powerline module 12*d*, providing LAN connection over domestic AC power distribution lines for video and data user appliances (PCs and STBs using dedicated PLC card adapter).

It is intended that the number and kind of add-on modules may vary, depending on the user needs and the development of local networking and external network access technologies. For example, the following types of add-on modules can be provided:

a HPNA (Home Phone Networking Alliance) module, providing LAN connection over local phone lines for video and data user appliances (PCs and STBs using a dedicated HPNA card adapter);

a firewall/parental control and VPN engine module for providing coprocessor functionalities for secure WAN access in addition to those existing in the base module 11;

an optical LAN expansion module, for interconnecting user appliances via optical fibers;

a video expansion module for the connection of a TV set, enabling digital video communication (e.g., video over IP) through the WAN communication channel for diffusion of video programs to the user premises (set top box), video conferencing and/or video telephony;

a Bluetooth expansion module;

a universal serial bus (USB) hub expansion module, enabling connection to USB ports of personal computers, printers or the like;

a card reader expansion module, enabling interaction with a user card, e.g. a smart card, intended for example to store a user profile for configuring the gateway.

In general, any type of home networking technology and access technology to the external network can be supported, by providing specific add-on modules.

In a preferred embodiment, the add-on modules 12 are piled up on the base module 11, to form a stack. The stacking of modules can be vertical or horizontal. Additional add-on modules can be at any time stacked up on the already existing stack of modules. The way in which the modules are interconnected, and the resulting physical shape of the gateway are not limitative to the present invention. Moreover, the different add-on modules can be plugged-in in any order.

The modules of the gateway 10 may be arranged in more than one stack, so that the gateway 10 is not restricted to be physically positioned in a unique location within the user premises. In the embodiment of FIG. 1, a first and a second stack 10*a*, 10*b* have been represented, which are placed in a first and in a second physical location, respectively, and are configured to communicate with corresponding sets of terminals 20, 20'.

In the represented embodiment, the first stack 10*a* comprises the base module 11 and the add-on modules 12*a* to 12*d*, and the second stack 10*b* includes further add-on modules 12*a'* and 12*b'*. The further add-on modules 12*a'* and 12*b'* may be for example identical to the add-on modules 12*a* and 12*b*, respectively and the set of terminals 20' may comprise terminals 20*a'* to 20*e'* identical to terminals 20*a* to 20*e*.

The separate stacks 10*a*, 10*b* may be connected to each other by means of one of the LAN technologies known in the art. For example, the different stacks may communicate with each other via an Ethernet-based connection. Alternatively, if both the first and second stacks 10*a*, 10*b* include a wireless module, communication between the two stacks can be made via these wireless modules. Similarly, if both the first and second stacks 10*a*, 10*b* include power line transmission (PLT) expansion modules, communication between the two stacks can be made over the AC power lines within the user premises. A further possibility is through HPNA modules.

In a different embodiment, also the second stack 10*b* may comprise a base module, so as to allow connection to two different WAN lines.

In a single-stack arrangement, a single AC power supply is sufficient to supply the base module and all the add-on modules with an unregulated voltage (12V or 15V). Each add-on module receives the unregulated voltage through an expansion connector and each module has on-board its power supply management generating the regulated voltages (1.8V, 2.5V, 3.3V, 5V) require by the electrical components of that module. Only the unregulated power supply is distributed to the expansion modules.

In a multi-stack arrangement, each delocalised stack needs a respective power supply serving all the modules of the stack.

If a PLC module is present, this module can supply all the modules of the stack without the need of external AC power supplies.

Figure 2:
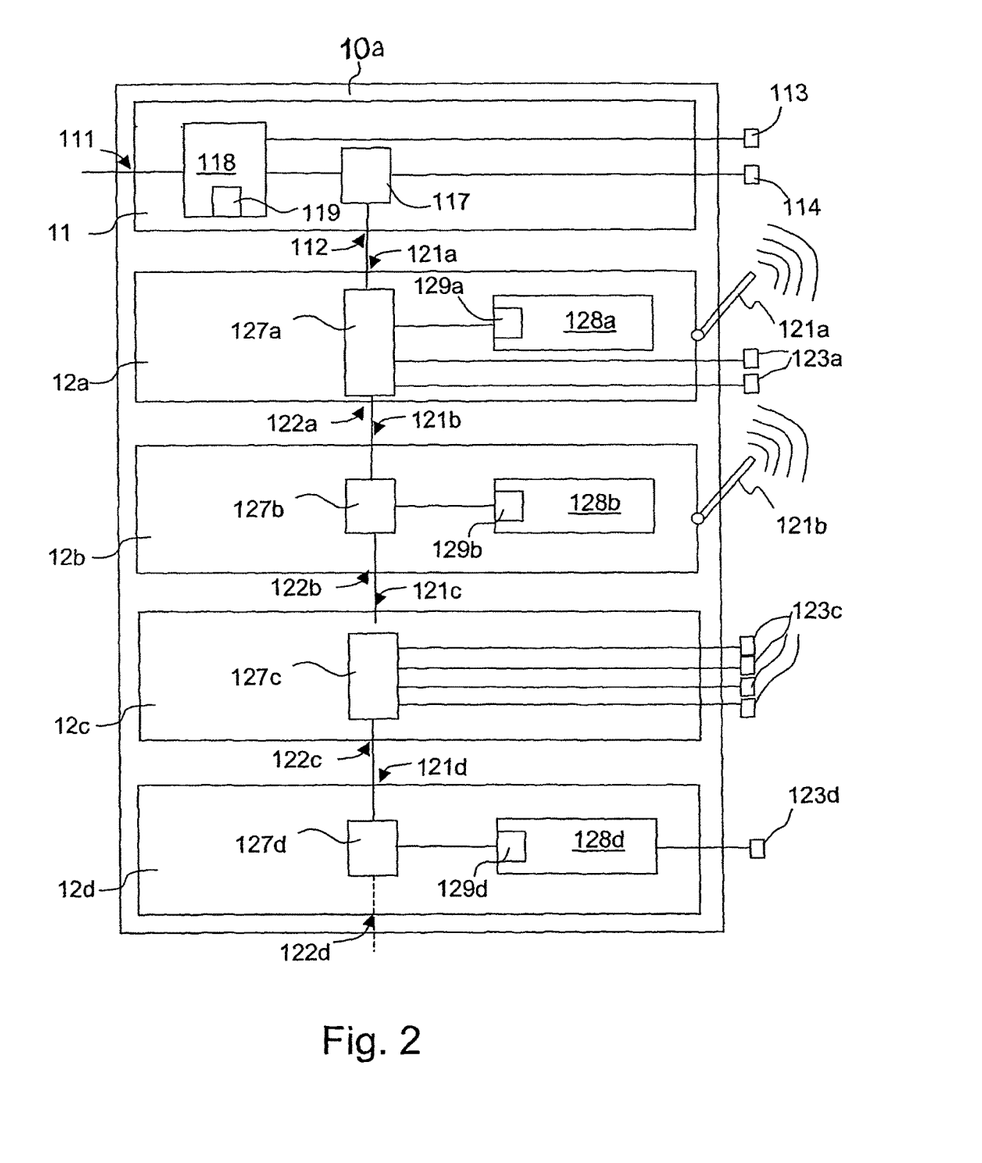
FIG. 2 schematically shows the internal architecture of a modular gateway to be used in the network of FIG. 1.

FIG. 2 provides a more detailed representation of the internal architecture of the first stack 10*a*.

Base module 11 has a WAN port 111 connected to line 4, a LAN expansion port 112 connected to the first add-on module 12*a* and two terminal access ports 113, 114, of USB and Ethernet type, respectively, for connection to corresponding user's terminals.

Base module 11 also includes a network processor 118 performing the required modem/router functionalities and a switch 117 for connecting the LAN side of processor 118 either to Ethernet port 114 or to the expansion port 112.

Network processor 118 includes an encryption/decryption (E/D) engine 119, for protecting transmitted information both on the WAN side (from the gateway 10 to the central office 5) and on the LAN side (between the base module 11 and the add-on modules 12).

The E/D engine 119 may be a hardware/software block using standard or proprietary algorithm to encrypt/decrypt the transmitted information (such as 3DES, MD5, etc., for data encryption) and using standard or proprietary security protocols to establish secure connections (VPN, PPP-authentication, SNMPv3, with public/private handshake keys, etc.).

The E/D engine 119 may be configured to interact with an external secure support device (e.g., a smart card), suitable to store sensitive encryption data, such as user-name/passwords, digital certificates, digital signatures, public/private keys, etc.

Each add-on module 12 has a first LAN expansion port 121 for Ethernet connection to the previous module in the stack and a second LAN expansion port 122 for Ethernet connection of the following module in the stack.

Moreover, depending on the type of module, the add-on modules 12 have one or more user LAN ports (Ethernet, USB, HPNA, POTS, etc.) and/or a RF antenna (Wifi, DECT, Bluetooth, etc.) to allow connection to corresponding user's terminals. For example, in the particular embodiment of FIG. 2:

the Wifi module 12*a* has a RF antenna 121*a* to provide a Wifi Access Point for 802.11b/g wireless connection; the Wifi module 12*a* may also have in addition one or more Ethernet port connectors 123*a*;

the IAD module 12*b* has a DECT radio interface (antenna) 121*b* for connection with the DECT handset and, in addition, may also have one or more POTS ports for corded telephones (not shown);

the switch module 12c has a plurality of Ethernet ports 123c for connection of a corresponding number of Ethernet terminals;

the Powerline module 12d has a plug-in port 123d for LAN connection over domestic AC power distribution and, in addition, may have one or more Ethernet ports (not shown).

Each add-on module 12 also includes, similarly to the base module 11, a corresponding switch 127. Switches 127 allow stackability of the modules by a Ethernet daisy chain scheme (through the ports 121, 122) and provides the above-mentioned on-board Ethernet ports.

Each add-on module 12 but the switch module 12a further includes a processor 128 for performing the additional required residential gateway functionalities (WiFi Access Point, IAD Voice, etc.)

Moreover, each add-on module 12 but the switch module 12a further includes an E/D device 129, for example identical to E/D device 119, for decrypting the information coming from the base module 11 and encrypting the information directed to the base module 11.

As shown in FIG. 1, three communication links can be identified in the connection between the WAN and the terminals of the LAN:

a first link L1 between the network central office and the base module 11 (in particular, to the WAN interface thereof);

a second link L2 among the modules 11, 12 of the gateway 10 (for infra-modules communication and signal transmission through the modules); and a third link L3 between the add-on modules 12 and the terminals 20.

The communication between the WAN network 2 and the LAN end user's terminals 20 travels along the first, second and third links L1, L2, L3.

The information transmitted on links L1, L2 and L3 comprises configuration data and user data (or traffic data). The information transmitted on links L1, L2 and L3 further comprises control data exchanged during working conditions. Configuration data and control data will be globally indicated as management data.

According to the present invention, all the transmitted information can be protected on the three links L1, L2, L3. However, due to the high computational costs of secure transmission mechanisms, which could affect the efficiency of real-time applications, it could be advantageous to limit the protection only to management data, i.e. to the remotely-provisioned data required for enabling the services (such as voice and video pay services) through the gateway.

Protection of the management data is first discussed. In particular, discussion is limited to configuration data, since protection of control data can be obtained by exactly the same techniques.

Configuration data are transmitted in a secure way so as to avoid interception and fraudulent use of such data. In the absence of such protection, the configuration data (for example that for voice and video premium services) could be sniffed during transmission and could be used to configure unauthorised devices or to make a fraudulent copy of the modules.

The configuration data include the gateway configuration data and the terminals configuration data. The gateway configuration data comprise both the data for setting-up the base module 11 (in particular the modem/router functionalities of the base module 11) and the data for configuring the add-on modules 12 according to the services requested by the user (for example voice-over-IP telephone numbers for Wifi or Dect phone terminals). The terminal configuration data comprise the data for configuring the terminals so as to make then suitable to receive the above services.

The gateway and terminals configuration data are provisioned by the service provider management system of the WAN 2 to the gateway 10 through link L1; these data are received by the base module 11 an stored therein.

In a following step, the base module 11 sends to each add-on module 12 the corresponding configuration data and the configuration data for the corresponding terminals through link L2.

Finally, each add-on module 12 sends the terminals configuration data to the corresponding terminals through link L3.

Protection of the management data transmitted on link L1 can be performed as follows.

A dedicated management platform of the WAN 2, working as a "manager", communicates with a dedicated "agent" in the gateway 10 (in particular, in the base module 11) to provide him the configuration data. The communication protocol used for this provisioning is for example based on the SNMPv3 protocol, strengthened by an encryption handshake mechanism (such as the Hughes handshake, which performs a periodic change of the encryption keys) for generating and exchanging the encryption keys.

In the gateway 10, the encryption for the above communication may be built, for example, starting from a public key stored in secure mode in a smart card, which can be accessed only knowing the related pin or pins. The smart card may also contain the digital signature/certificate to validate the download on the gateway 10 of the provisioning data sent by the management platform of the WAN 2 ("secure download").

On link L2, the configuration of the add-on modules 12 is performed through a secure exchange of information between the base module 11 and the add-on modules 12. This communication between the base module 11 and the add-on modules 12 may use a command/answer mechanism according to which each configuration/provisioning command of the base module 11 is followed by an acknowledgement message from the add-on module 12. Moreover, the communication is protected by using a secure communication protocol, by which the base module 11 sends protected configuration data to the add-on modules 12 and the add-on modules 12 send protected responses to the base module 11.

Encryption/decryption is performed by the E/D engine 119 on the base module 11 and by the E/D engines 129 on the add-on modules 12.

Figure 3:
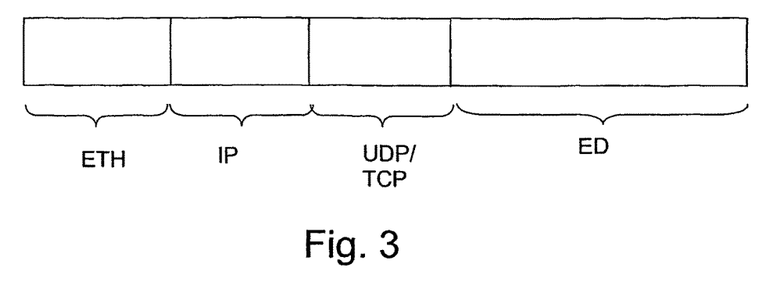
FIG. 3 schematically represents the protocol format used for infra-module transmission.

FIG. 3 shows the format of a possible secure communication protocol suitable for this purpose. The secure communication protocol of this example uses the TCP/IP stack format, having an Ethernet (ETH) layer, an IP layer and a TCP/UDP layer. The payload of the TCP/UDP layer, carrying the management data, is encrypted. The encrypted data is indicated with ED in FIG. 3. The encryption may be, for example, of the 3DES type, MD5 type, or others, and the modules may use a predefined encryption key or implement handshake mechanisms, as previously mentioned for the link L1. For exchanging information through the above protocol, the base module 11 and the add-on modules 12 use a predefined TCP/UDP socket.

The provisioning of configuration data from the base module 11 to the add-on modules 12 through the illustrative protocol of FIG. 3 may be performed for example as follows:

each time an add-on module 12 is plugged to the modular stack of the gateway 10, the add-on module 12 sends to the base module 11 an authentication request (DHCP request with a proprietary identification TAG specifying the type of add-on module), which is different for each add-on module;

following this request, the base module 11 recognizes the add-on module 12 and assigns to it an IP address which will be used for identifying it;

the base module 11 then sends to the add-on module 12 the corresponding configuration data.

The above encryption mechanism on the link L2 is independent on the number of add-on modules, on the number of stacks in the gateway and on the typology of connection among modules or stacks, since the encryption is done on a layer (UDP/TCP payload) higher than the physical layer of the connectivity.

In this case, the data encryption is advantageously performed on the payload of the TCP/UDP packets while the Ethernet layer and the IP layer can be transmitted not encrypted. In fact, the stackable architecture may require readability of layer 2 (Ethernet) and layer 3 (IP) addresses, for example for data switching functionalities and TOS-based IP packet priority.

On link L3, each add-on module 12, 12' communicates with the corresponding terminals 20, 20' so as to perform an authomatic configuration thereof (for those terminals that require configuration), thus avoiding manual setup by the users.

The configuration may be different depending on the type of terminal.

For example, in the case of a SIP VoIP Wifi phone, the voice service parameters (SIP server IP address, SIP key, client line identification, etc.) are provisioned automatically from the Wifi add-on module 12a, 12a' or the base module 11 to the Wifi phone 22, 22' upon receipt of a registration request from the Wifi phone. The request from the Wifi phone may me made by addressing an HTTP message toward the WEB server functionality of the gateway 10 (which can be located in the base module 11, in the add-on module 12 associated to the terminal or in a dedicated add-on module), and the configuration data (voice server parameters) may be provisioned by a response XML file. In this case, the request can be made using a non-secure protocol like the HTTP since the information exchanged between the Wifi add-on module 12a, 12a' and the Wifi terminal 22, 22' can be encrypted by using standard wireless encryption mechanisms, such as WPA/WEP (WPA standing for "WiFi Protected Access" and WEP for "Wired Equivalent Privacy"), Access Control List, etc.

In the case of corded terminals (e.g., a VoIP corded phone, Set Top Box, particular VoIP applications running on PCs, etc.) connected through Ethernet, USB, PLT, HPNA, etc., wherein there is no encryption on the physical layer, the registration request can be performed using the secure HTTPs protocol (which is the HTTP protocol encrypted using SSL/TLS protocol). The HTTPs request is addressed by the terminals towards the WEB server functionality on the gateway 10. Automatic provisioning of configuration data may be performed by using HTTPs or other types of secure protocols, such as FTP (which in turn uses SSL/TLS), or by using an ad-hoc secure proprietary protocol like the one implemented for link L2.

As previously mentioned, it can be advantageous to protect not only the management data, but all types of data including the user data.

For example, in particular applications, such as in voice services for entities dealing with secret information (like banks, police stations or private companies), it may be important to guarantee protection against espionage of the information transmitted along the line. Moreover, also in typical residential environments it is desirable to guarantee privacy and/or security in the use of certain services through the LAN terminals. Therefore, in these cases, it is important that not only transmission of management data but also transmission of user data (such as the VoIP calls traffic) is made secure along links L1, L2 and L3.

However, while protection on link L1 could possibly be provided by the telecommunication operator and the protection on link L3 could possibly be obtained by secure mechanisms provided on the terminal, the link L2 necessitates specific protection. In the absence of such protection on link L2, the gateway 10 could represent a possible point of fraudulent intrusion.

Protection of all data, including user data, along the first link L1 can be guaranteed for example by providing, between the central office 5 of the WAN network 2 and the gateway 10, a secure authenticated and encrypted communication channel, such as VPN, PPP, IPSec, or any other standard network protection mechanisms.

On link L2, the security of all data transmitted among the base module 11 and the add-on modules 12, 12' may be obtained for example by using standard security protocols such as IPSec, or by using a proprietary encryption of the payload of the TCP/UDP layer as previously described in connection with the protection of configuration data on link L2. In this case, the data encryption is advantageously performed on the payload of the IP packets (such as by using IPSec) or on the payload of the TCP/UDP packets (such as by using the protocol of FIG. 3), while the Ethernet layer and the IP header can be transmitted not encrypted. In fact, the stackable architecture may require readability of layer 2 (Ethernet) and layer 3 (IP) addresses, for example for data switching functionalities and TOS-based IP packet priority.

The computational capacity of E/D engines 119, 129 shall be dimensioned according to the type of security to be implemented. Of course, protection of all data traffic will require more powerful E/D engines than required by protection of only configuration data.

Protection of all data traffic along the third link L3 can be performed in different ways depending on the particular terminals, such as the above-mentioned WPA/WEP wireless encryption for the Wifi terminals, SSL/TLS for terminals connected via Ethernet (such as PCs, Set Top Boxes, etc.), USB, HPNA, or PLC wired links.

Although the present invention has been disclosed and described by way of some embodiments, it is apparent to those skilled in the art that several modifications to the described embodiments, as well as other embodiments of the present invention are possible without departing from the scope thereof as defined in the appended claims.

The invention claimed is:

1. A method for secure information transmission in a telecommunication network, the telecommunication network comprising a wide area network (WAN) and a local area network (LAN), the LAN comprising a modular gateway connecting the LAN to the WAN, and at least one user's terminal operatively connected to the modular gateway, the modular gateway comprising a base module and at least one add-on module operatively connectable to the base module, each of the base module and the at least one add-on module including an encryption and decryption engine, the method comprising:

storing, at the base module, information received at a WAN port of the base module, from the WAN, the information comprising traffic data and gateway and terminal configuration and control data, the gateway configuration and control data including data for configuring the at least one add-on module according to services requested by the at least one user's terminal, and the terminal configuration and control data including data for configuring the at least one user's terminal to receive the requested services;

assigning to the at least one add-on module, by the base module, a unique IP address for identifying the at least one add-on module in response to an authentication request received from the at least one add-on module at the base module, the authentication request sent by the at least one add-on module in response to operatively connecting the at least one add-on module to the base module and including an identifier specifying the type of the at least one add-on module;

protecting the transmission of the information between the base module and the at least one add-on module by encrypting, at the base module by the encryption and decryption engine of the base module, only the stored gateway and terminal configuration and control data in the base module;

sending, from the base module to the at least one add-on module via a predefined TCP/UDP socket, in response to operatively connecting the at least one add-on module to the base module, the encrypted gateway and terminal configuration and control data together with an unencrypted IP header and an unencrypted Ethernet layer, the encrypted gateway and terminal configuration and control data including data for configuring the at least one add-on module corresponding to the assigned IP address; and decrypting, in the encryption and decryption engine of the at least one add-on module, at least the gateway and terminal configuration and control data corresponding to the IP address assigned to the at least one add-on module.

2. The method of claim 1, further comprising encrypting gateway and terminal configuration and control data in the encryption and decryption engine of the add-on module and decrypting at least the gateway and terminal configuration and control data in the encryption and decryption engine of the base module.

3. The method of claim 1, further comprising receiving at least encrypted gateway and terminal configuration and control data from the WAN at the WAN port of the base module and decrypting at least the encrypted gateway and terminal configuration and control data in the encryption and decryption engine of the base module.

4. The method of claim 1, further comprising encrypting at least gateway and terminal configuration and control data in the encryption and decryption engine of the base module and sending at least the encrypted gateway and terminal configuration and control data to the WAN.

5. The method of claim 1, wherein the gateway and terminal configuration and control data is in the payload of a TCP/UDP protocol layer.

6. A telecommunication network comprising:
a wide area network (WAN);
a local area network (LAN) connected to the WAN, the LAN comprising a modular gateway and at least one user's terminal operatively connected to the modular gateway, the modular gateway comprising a base module interfacing with the WAN and at least one add-on module, connected to the base module, each of the base module and the add-on modules including an encryption and decryption engine, wherein the WAN is connectable to the user's terminal via:
a first link between the WAN and the base module of the modular gateway,
a second link between the base module and the add-on modules, and
a third link between the add-on module and the user's terminal, and wherein the modular gateway is configured to:
store information received at a WAN port of the base module on the first link, the information comprising traffic data and gateway and terminal configuration and control data, the gateway configuration and control data including data for configuring the at least one add-on module according to services requested by the at least one user's terminal, and the terminal configuration data including data for configuring the user's terminal to receive the requested service, assign to the at least one add-module, by the base module, a unique IP address for identifying the at least one add-on module in response to an authentication request received at the base module, on the second link, from the at least one add-on module, the authentication request sent by the at least one add-on module in response to operatively connecting the at least one add-on module to the base module and including an identifier specifying the type of the at least one add-on module, provide protection of the information by encrypting, at the encryption and decryption engine of the base module, only the stored gateway and terminal configuration and control data, and send, from the base module to the at least one add-on module, in response to operatively connecting the at least one add-on module to the base module, the encrypted gateway and terminal configuration and control data via a predefined TCP/UDP socket on the second link together with an unencrypted IP header and an unencrypted Ethernet layer, the encrypted gateway and terminal configuration and control data including data for configuring the at least one add-on module corresponding to the assigned IP address, decrypt, in the encryption and decryption engine of the at least one add-on module, at least the gateway and terminal configuration and control data corresponding to the IP address assigned to the at least one add-on module.

7. The telecommunication network of claim 6, wherein the WAN comprises a central office suitable to communicate with the modular gateway via the first link and wherein the central office and the modular gateway are configured to provide encryption on the first link.

8. The telecommunication network of claim 6, wherein the modular gateway and the user's terminal are configured to provide encryption on the third link.

9. A residential modular gateway for a telecommunication network, the residential modular gateway being adapted for connecting a local area network (LAN) to a wide area network (WAN) and comprising a base module and at least one add-on module operatively connectable thereto, each of the base module and the at least one add-on module including an encryption and decryption engine, the base module being configured to:

store information received at a WAN port of the base module from the WAN, the information comprising traffic data and gateway and terminal configuration and control data, the gateway configuration and control data including data for configuring the at least one add-on module according to services requested by at least one user's terminal operatively connectable to the residential modular gateway, the terminal configuration and control data including data for configuring the at least one user's terminal to receive the requested services, assign to the at least one add-module a unique IP address for identifying the at least one add-on module in response to an authentication request received at the base module from the at least one add-on module, the authentication request sent by the at least one add-on module in response to operatively connecting the at least one add-on module to the base module and including an identifier specifying the type of the at least one add-on module, provide protection of the information by encrypting, by the encryption and decryption engine of the base module, only the stored gateway and terminal configuration and control data, and send to the at least one add-on module, in response to operatively connecting the at least one add-on module to the base module, encrypted gateway and terminal configuration and control data together with an unencrypted IP header and an unencrypted Ethernet layer via a predefined TCP/UDP socket, the encrypted gateway and terminal configuration and control data including data for configuring the at least one add-on module corresponding to the assigned IP address, and the at least one add-on module being configured to:
  decrypt, in the encryption and decryption engine of the at least one add-on module, at least the gateway and terminal configuration and control data corresponding to the IP address assigned to the at least one add-on module.

10. The residential modular gateway of claim 9, wherein the modular gateway comprises a first plurality of add-on modules arranged in a first stack.

11. The residential modular gateway of claim 10, wherein the modular gateway comprises a second plurality of add-on modules arranged in a second stack connectable to the first stack.

12. The residential modular gateway of claim 9, wherein the add-on module comprises a Wifi module suitable to communicate with a Wifi phone and an integrated access device module suitable to communicate with a Pots or Dect terminal.

* * * * *